US005601179A

United States Patent [19]

Wente et al.

[11] Patent Number: 5,601,179

[45] Date of Patent: Feb. 11, 1997

[54] BALUSTRADE SKIRT PANEL

[75] Inventors: Gerald Wente, Pohl; Willy Adrian, Obernkirchen, both of Germany

[73] Assignee: Otis Elevator Company, Farmington, Conn.

[21] Appl. No.: 583,579

[22] Filed: Jan. 5, 1996

Related U.S. Application Data

[63] Continuation of Ser. No. 185,739, Jan. 24, 1994, which is a continuation-in-part of Ser. No. 7,418, Jan. 22, 1993, abandoned.

[51] Int. Cl.[6] .......... B65G 15/00

[52] U.S. Cl. .......... 198/335

[58] Field of Search .......... 198/332, 333, 198/335, 337, 338, 326

[56] References Cited

U.S. PATENT DOCUMENTS 2,193,583 3/1940 Dunlop .......... 198/336
4,953,686 9/1990 Rülke .......... 198/332
5,186,302 2/1993 Johnson et al. .......... 198/335
5,215,177 6/1993 Johnson et al. .......... 198/335

FOREIGN PATENT DOCUMENTS 2941773 4/1981 Germany .......... 198/335

*Primary Examiner*—William E. Terrell
*Assistant Examiner*—Khoi H. Tran

[57] ABSTRACT

A one piece balustrade skirt panel is provided for a passenger conveying device having a plurality of moving treadplates. The skirt panel comprises a formed, seamless cross-sectional profile having a front surface, a back surface, a plurality of ribs extending between the front and back surfaces, and apparatus for maintaining the skirt panel in close proximity to the treadplates. The formed, seamless cross-sectional profile extends in the lengthwise direction.

21 Claims, 3 Drawing Sheets

BALUSTRADE SKIRT PANEL

Pursuant to 37 C.F.R. §1.53, the subject matter claimed herein is a continuation of Ser. No. 08/185,739 filed Jan. 24, 1994, which is a continuation-in-part of Ser. No. 08/007,418, filed Jan. 22, 1993, abandoned.

BACKGROUND OF THE INVENTION

1. Technical Field

This invention relates to passenger conveyors in general, and to balustrade skirt panels for passenger conveyors in particular.

2. Background Art

Escalators, moving walkways, and other passenger conveying devices efficiently move a large volume of pedestrian traffic from one point to another. Passengers step on moving treadplates (e.g. steps, belts, pallets, etc.) and are transported along at a constant rate of speed. For safety reasons, passenger handrails are provided, traveling in the same direction and speed as the treadplates. A balustrade assembly supports and guides one of the handrails on each side of the treadplates.

Each balustrade assembly includes a balustrade panel which extends up from a base to support the handrail. Externally, the base consists of an outer decking, an inner profile, and a skirt panel. The outer decking encloses the mechanics on the side of the balustrade panel opposite the moving treadplates. The inner profile encloses the mechanics adjacent the moving treadplates. The inner profile also provides a transition section between the balustrade panel and the skirt panel.

The skirt panel lies in close proximity to, but out of contact with, the moving treadplates. Because of the proximity to the moving treadplates, the skirt panel must be a rigid panel to prevent pinching between the panel and the treadplates. Skirt panels typically are assembled from structural members and sheet metal. The sheet metal provides the surface in close proximity to the treadplates and the structural members add rigidity to the fabrication. It is known in the art that the hardware necessary to locate and hold the skirt panel relative to the treadplates may be incorporated into the structural members. For example, if bolts with "T"-shaped heads are employed to locate and position the skirt panel, mating "C"-shaped channels are used as the structural members.

There are several disadvantages to assembled skirt panels. First, the structural members and the sheet metal faces must be attached by weld or by fasteners. Either way, the exposed panel face is marred by heat discoloration or by fasteners. Second, to achieve an assembled skirt panel of sufficient stiffness, it is necessary to use sheet metal and structural members of considerable strength. As a result, the assembled skirt panel is more expensive, cumbersome to work with, and requires more space and stronger mounting hardware. Third, creating an assembly adds manufacturing steps, and therefore time and expense to the manufacturing process. Fourth, the assembled elements of the skirt panel may vibrate free and create undesirable noise. A person of ordinary skill in the art will recognize that the "quietness" of a passenger conveyor is perceived as an indication of the quality of the device. In sum, fabricated skirt panels have several considerable disadvantages.

DISCLOSURE OF THE INVENTION

It is, therefore, an object of the present invention to provide a balustrade skirt panel for a passenger conveying device which facilitates assembly and maintenance.

It is a further object of the present invention to provide a balustrade skirt panel for a passenger conveying device having sufficient stiffness to minimize deflection of the skirt panel.

It is a still further object of the present invention to provide a balustrade skirt panel for a passenger conveying device which incorporates numerous peripheral brackets, thereby minimizing the number of pieces in the balustrade assembly.

It is a still further object of the present invention to provide a balustrade skirt panel for a passenger conveying device which minimizes or eliminates the possibility of a marred of the exposed skirt panel surface.

It is a still further object of the present invention to provide a balustrade skirt panel for a passenger conveying device having a universal profile which may accommodate numerous different applications.

According to the present invention, a one piece balustrade skirt panel is provided for a passenger conveying device having a plurality of moving treadplates. The skirt panel comprises a formed, seamless cross-sectional profile having a front surface, a back surface, a plurality of ribs extending between the front and back surfaces, and means for maintaining the skirt panel in close proximity to the treadplates. The formed, seamless cross-sectional profile extends in the lengthwise direction.

According to an aspect of the present invention, the cross-sectional profile of the skirt panel comprises integrally formed structural members, which extend lengthwise, for stiffening the skirt panel.

According to a further aspect of the present invention, the seamless balustrade skirt panel is formed by extrusion.

According to a still further aspect of the present invention, an adjustable positioning means is provided for positioning the skirt panel in a plane perpendicular to the treadplates.

According to a still further aspect of the present invention, a guide means is provided for guiding the moving treadplates.

According to a still further aspect of the present invention, a means for mounting a face panel on the front surface of the balustrade skirt panel is provided.

Several significant advantages result from the formed seamless cross-sectional profile. One advantage is the formed, seamless one piece balustrade skirt panel eliminates the need to assemble the skirt panel and therefore facilitates assembly and maintenance of the passenger conveying device.

Another advantage is that the formed, seamless one piece balustrade skirt panel includes integrally formed structural members which give the skirt panel a high degree of stiffness, which thereby minimizes the deflection of the skirt panel.

Still another advantage is that the formed, seamless one piece balustrade skirt panel incorporates numerous peripheral brackets, thereby minimizing the number of pieces in the balustrade assembly.

Still another advantage is that the formed, seamless one piece balustrade skirt panel minimizes or eliminates marring of the exposed skirt panel surface. A person of skill in the art will recognize that an aesthetically "clean" exposed skirt panel surface is a desirable attribute.

Still another advantage is that the formed, seamless one piece balustrade skirt panel comprises a universal profile which may accommodate numerous different applications.

Still another advantage is that the formed, seamless one piece balustrade skirt panel eliminates the possibility that constituent parts assembled into a skirt panel will vibrate and generate undesirable noise. A person of ordinary skill in the art will recognize that the "quietness" of a passenger conveyor is perceived as an indication of the quality of the device.

Still another advantage is that the formed, seamless one piece balustrade skirt panel provides a compact, lightweight skirt panel that is easy to work with during assembly and maintenance.

These and other objects, features and advantages of the present invention will become more apparent in light of the detailed description of the best mode embodiment thereof, as illustrated in the accompanying drawings.

BEST MODE FOR CARRYING OUT THE INVENTION

Figure 1:
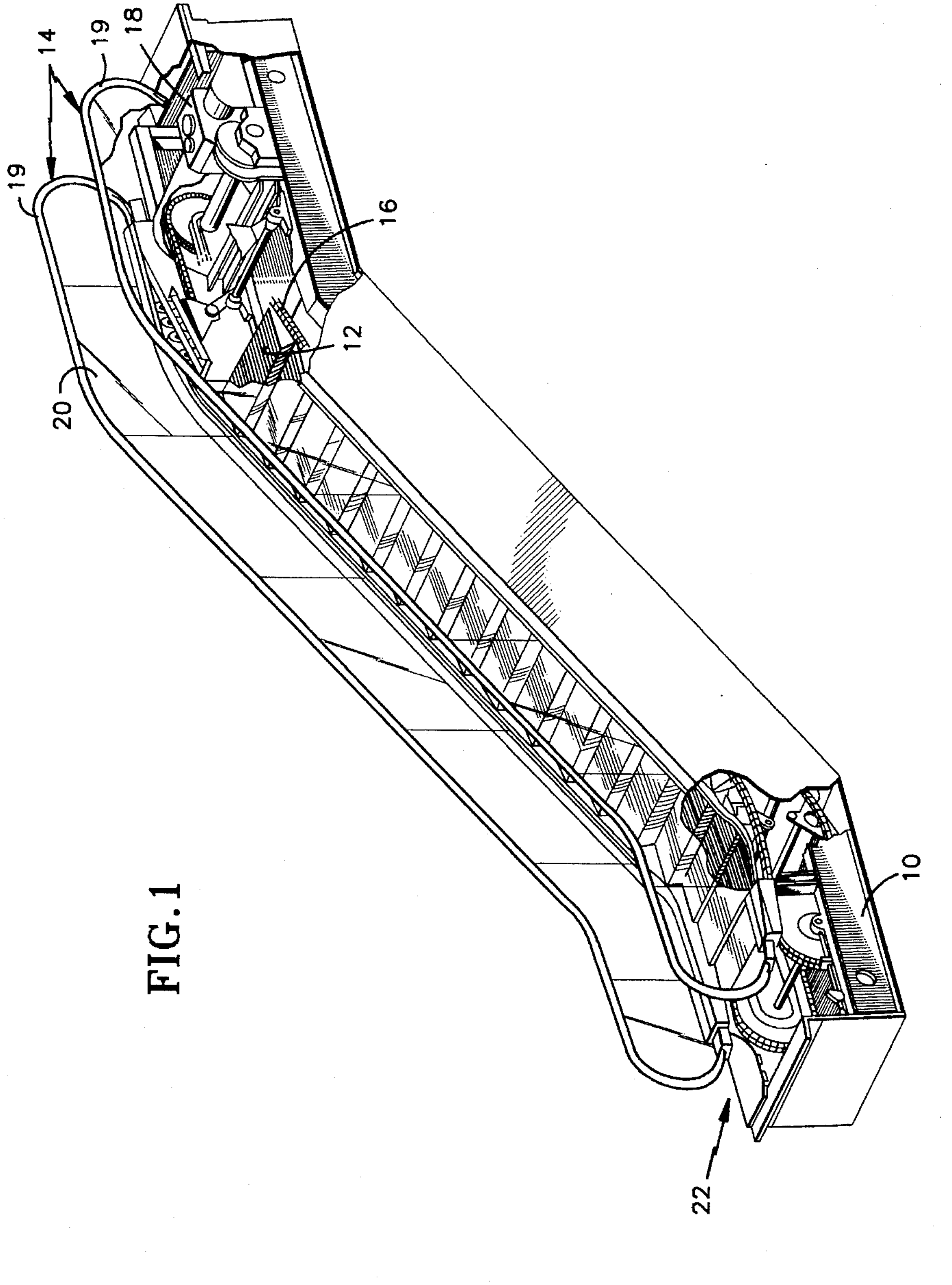
FIG. 1 shows a perspective view of an escalator partially cut away, having a pair of balustrade assemblies with a plurality of moving steps therebetween.

Referring to FIG. 1, an escalator is shown having a frame 10, a plurality of moving steps 12, and a pair of balustrade assemblies 14. The steps 12 are connected to a step chain 16 which is driven around a circuitous path by an electric drive motor 18. On each side of the steps 12, a handrail 19 is driven in the same direction and speed as the steps 12, as is known in the art. The handrails 19 enable the passenger(s) (not shown) to steady themselves while riding the escalator.

Figure 2:
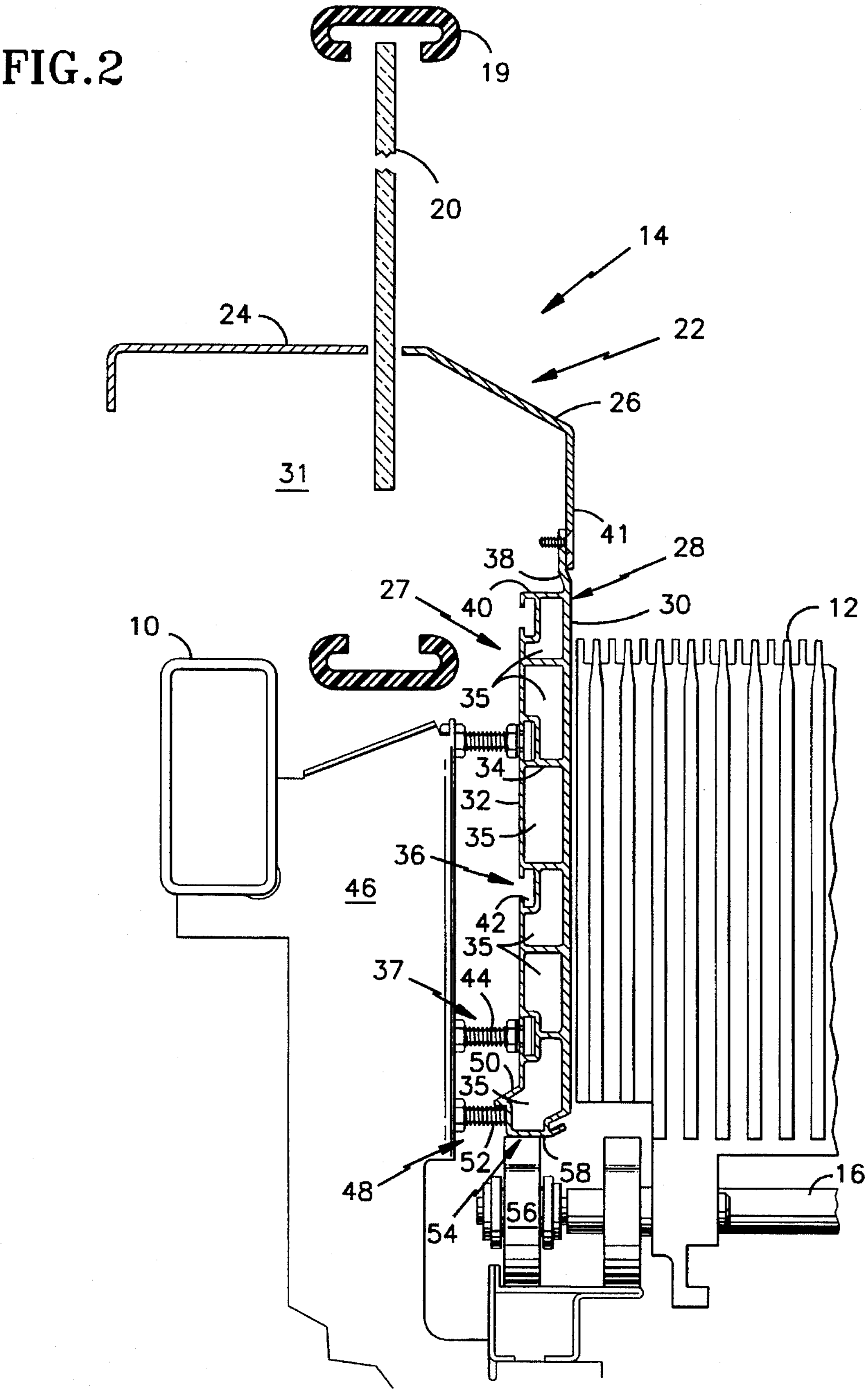
FIG. 2 is a cross-sectional view of a balustrade assembly.

Now referring to FIG. 2, each balustrade assembly 14 includes a balustrade panel 20 which extends up from a base 22 to support and guide the handrail 19. Externally, the base 22 consists of an outer decking 24, an inner profile 26, and a skirt panel 28. The outer decking 24 encloses the mechanics (not shown; the mechanics are known in the art) on the side 31 of the balustrade panel 20 opposite the moving steps 12. The inner profile 26 encloses the mechanics (not shown; the mechanics are known in the art) adjacent the moving steps 12 and provides a transition section between the balustrade panel 20 and the skirt panel 28.

The skirt panel 28 comprises a one piece formed, seamless cross-sectional profile 27 that extends lengthwise. The cross-sectional profile 27 is defined by a front surface 30, a back surface 32, a plurality of ribs 34 extending therebetween, integrally formed with the front 30 and back 32 surfaces, and maintaining means 36 for maintaining the panel 28 in close proximity to the moving steps 12. Integrally formed is defined as the absence of seams between structural elements; e.g. between the front 30 and back 32 surfaces and the ribs 34.

In the preferred embodiment, the cross-sectional profile 27 of the balustrade skirt panel 28 is formed by extruding aluminum. Alternatively, the skirt panel 28 may comprise other formable materials including, but not limited to, other metals, plastics, or composites. Furthermore, the skirt panel 28 forming process is not limited to extrusion, and may include injection molding or casting for example.

The front 30 and rear 32 surfaces, and the ribs 34 extending therebetween, form structural members 35, or "tubes", which extend continuously lengthwise. The tubes 35 give the skirt panel 28 considerable rigidity and thereby increase the amount of force necessary to deflect the skirt panel 28.

A flange 38 attached to the front surface 30 extends above the upper most rib 40. The flange 38 is offset to permit the inner profile 26 to attach to the flange 38 with the outer surface 41 of the inner profile 26 flush with the front surface 30. A mating bolt assembly 37 maintains the panel in close proximity to the moving steps 12. In one embodiment, the mating bolt assembly 37 includes a plurality of "C-shaped" channels 42 integrally formed in the back surface 32 of the skirt panel 28 that extend continuously lengthwise. "T-shaped" bolts 44 are received within the C-channels 42, at any point along the length of the C-channels 42, and rotated to prevent relative motion between the bolts 44 and the channels 42. The bolts 44 are fixed to mounting hardware 46 conventionally attached to the frame 10 of the escalator, thereby rigidly fixing the skirt panel 28 to the frame 10. A person of skill in the art will recognize that C-channels and T-bolts are an example of a mating male and female maintaining means 36 and that other mating geometries may be used alternatively.

The skirt panel 28 further comprises a lip 50 integrally formed in the cross-sectional profile 27 of the skirt panel 28. The lip 50 and a bolt 52 act as an adjustable positioning means 48 to position the skirt panel 28 in the plane perpendicular to the steps 12. The lip 50 extends outwardly from the back surface 32 of the skirt panel 28 and continuously along the length of the skirt panel 28. The bolt 52 conventionally attaches to either the frame 10 or to a bracket 46 attached to the frame 10. When the skirt panel 28 is properly positioned in the plane perpendicular to the steps 28, the bolt 52 is adjusted under the lip 50 extending out from the back surface 32 of the skirt panel 28, at any point along the length of the skirt panel, thereby enabling the lip 50 and skirt panel 28 to rest on the bolt 52. The bolt 52 prevents the skirt panel 28 from moving below that point.

The skirt panel 28 further comprises a surface 58, integrally formed in the cross-sectional profile 27 of the skirt panel 28, which acts as a guide means 54 for guiding rollers 56 attached to the moving steps 12. The flat surface 58 is integrally formed in the skirt panel 28 between the front 30 and back 32 surfaces. The flat surface 58 connects the edges of the front 30 and back 32 surfaces opposite the flange 38 attached to the inner profile 26. The flat surface 58 serves as an upthrust track to limit the distance the rollers 56 can travel from a step chain guide track 61 attached to the frame 10.

Figure 3:
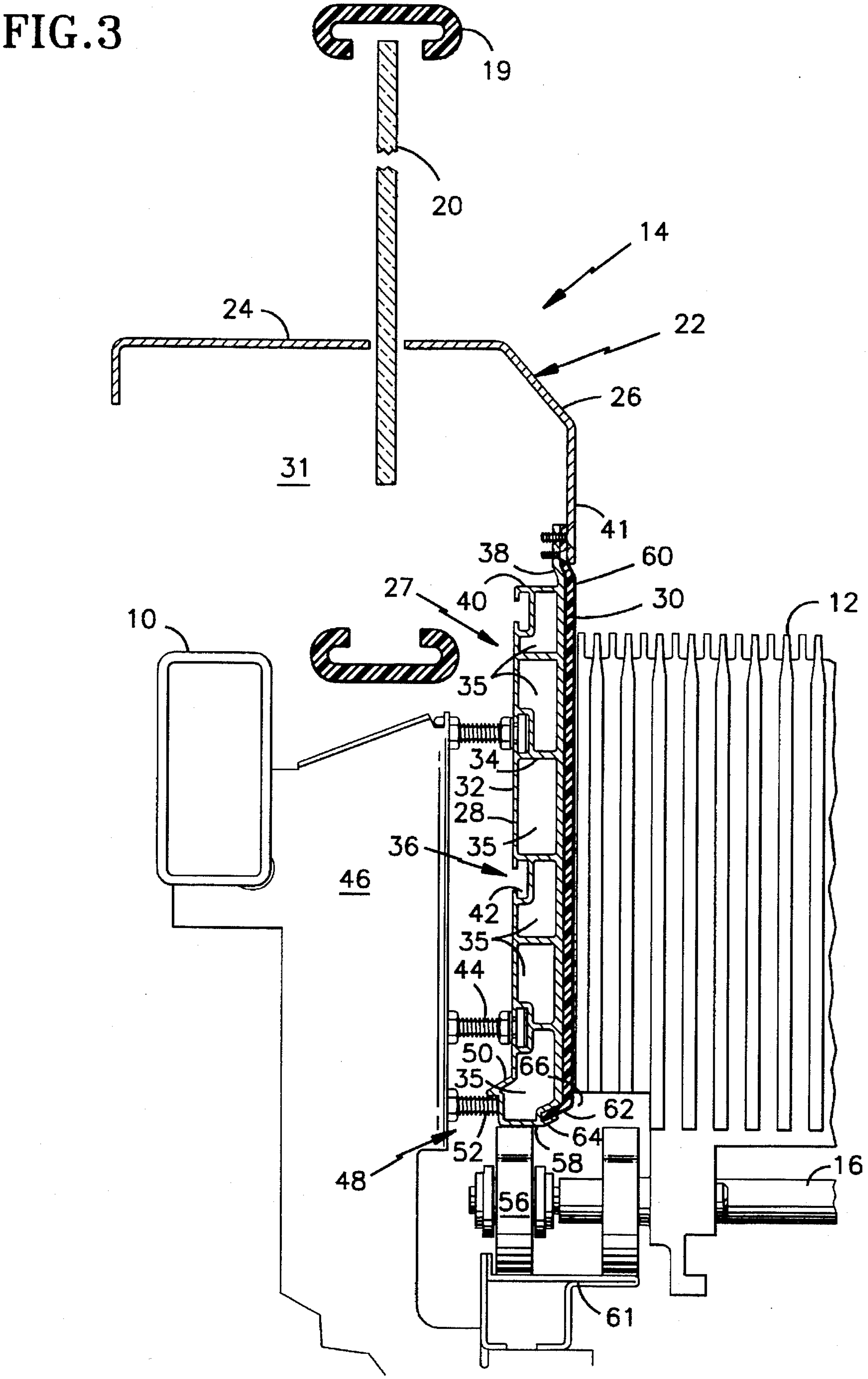
FIG. 3 is the cross-sectional view shown in FIG. 2, with the addition of a face panel attached to the skirt panel.

Referring to FIG. 3, in one embodiment the skirt panel 28 includes a slot 64 adjacent the flat surface 58, integrally formed in the cross-sectional profile 27 of the skirt panel 28, for receiving a face panel 60. A tab 62 attached to the face panel 60 is received within the slot 64. The opening 66 of the slot 64 is flush with the plane of the front surface 30. The remainder of the face panel 60 is glued to the front surface 30. The face panel 60, comprised of decorative material such as brass, stainless steel, colored hardened plastics, or others, serves as both a cosmetic panel and a wear panel.

A person of skill in the art will recognize that the balustrade skirt panel 28 described heretofore as an escalator balustrade skirt panel, may be utilized in a host of different passenger conveying devices. In the case of a moving walkway (not shown), the skirt panel 28 would be adjacent a moving belt (or pallet; neither is shown) rather than the moving steps 12 of an escalator.

Although this invention has been shown and described with respect to the detailed embodiments thereof, it will be understood by those skilled in the art that various changes in form and detail thereof may be made without departing from the spirit and scope of the claimed invention.

We claim:

1. A balustrade skirt panel for a passenger conveying device having a plurality of moving treadplates, comprising:

a formed, seamless cross-sectional profile extending in a lengthwise direction, wherein said profile includes,
- a front surface;
- a back surface;
- a plurality of ribs, extending between said front and back surfaces;
- means for maintaining said skirt panel in close proximity to the treadplates; and
- means for mounting a face panel, said face panel to be attached to said front surface of said skirt panel, wherein said means for mounting said face panel comprises a slot integrally formed in said profile for receiving an edge of said face panel;

wherein said front surface, said back surface, and said ribs extending therebetween, form integral structural members extending along the length of said skirt panel.

2. A balustrade skirt panel for a passenger conveying device according to claim 1, wherein said formed, seamless cross-sectional profile is formed by an extrusion process.

3. A balustrade skirt panel for a passenger conveying device according to claim 1, wherein said means for maintaining said skirt panel comprises:

a plurality of channels, integrally formed in said back surface; and means cooperating with said channels for adjustably securing said skirt panel to a frame member of the passenger conveying device.

4. A balustrade skirt panel for a passenger conveying device according to claim 1, wherein said formed, seamless cross-sectional profile further comprises:

means for adjustably positioning said skirt panel in a plane perpendicular to the treadplates.

5. A balustrade skirt panel for a passenger conveying device according to claim 4, wherein said means for adjustably positioning said skirt panel comprises:

a lip, integrally formed with and extending out from said back surface of said skirt panel; and a bolt, adjustably attached to a frame member of the passenger conveying device and in register with said lip, thereby supporting and permitting adjustment of said skirt panel in a plane perpendicular to the treadplates.

6. A balustrade skirt panel for a passenger conveying device according to claim 3, wherein said formed, seamless cross-sectional profile further comprises:

means for adjustably positioning said skirt panel in a plane perpendicular to the treadplates.

7. A balustrade skirt panel for a passenger conveying device according to claim 6, wherein said means for adjustably positioning said skirt panel comprises:

a lip, integrally formed with and extending out from said back surface of said skirt panel; and a bolt, adjustably attached to said frame member of the passenger conveying device and in register with said lip, thereby supporting and permitting adjustment of said skirt panel in a plane perpendicular to the treadplates.

8. A balustrade skirt panel for a passenger conveying device, according to claim 1, wherein said formed, seamless cross-sectional profile further comprises:

an upthrust track;

wherein when said upthrust track is positioned in a spaced apart, parallel position relative to a roller track attached to said frame member of the passenger conveying device, rollers attached to the moving treadplates are guided therebetween.

9. A balustrade skirt panel for a passenger conveying device, according to claim 6, wherein said formed, seamless cross-sectional profile further comprises:

an upthrust track;

wherein when said upthrust track is positioned in a spaced apart, parallel position relative to a roller track attached to said frame member of the passenger conveying device, rollers attached to the moving treadplates are guided therebetween.

10. A passenger conveying device, comprising:

a frame;

a plurality of treadplates, wherein said treadplates travel a circuitous path about said frame;

a balustrade assembly, for supporting a handrail adjacent said treadplates; said balustrade assembly including:

a skirt panel, having a formed, seamless cross-sectional profile extending in a lengthwise direction, wherein said profile includes:
- a front surface;
- a back surface;
- a plurality of ribs, extending between said front and back surfaces;
- means for maintaining said skirt panel in close proximity to the treadplates; and
- means for mounting a face panel, said face panel to be attached to said front surface of said skirt panel, wherein said means for mounting said face panel comprises a slot integrally formed in said profile for receiving an edge of said face panel;

wherein said front surface, said back surface, and said ribs extending therebetween, form integral structural members extending along the length of said skirt panel.

11. A passenger conveying device according to claim 10, wherein said formed, seamless cross-sectional profile is formed by an extrusion process.

12. A passenger conveying device according to claim 10, wherein said means for maintaining said skirt panel comprises:

a plurality of channels, integrally formed in said back surface; and means cooperating with said channels for adjustably securing said skirt panel to a frame member of the passenger conveying device.

13. A passenger conveying device according to claim 10, wherein said formed, seamless cross-sectional profile further comprises:

means for adjustably positioning said skirt panel in a plane perpendicular to the treadplates.

14. A passenger conveying device according to claim 13, wherein said means for adjustably positioning said skirt panel comprises:

a lip, integrally formed with and extending out from said back surface of said skirt panel; and a bolt, adjustably attached to a frame member of the passenger conveying device and in register with said lip, thereby supporting and permitting adjustment of said skirt panel in a plane perpendicular to the tread-plates.

15. A passenger conveying device according to claim 11, wherein said formed, seamless cross-sectional profile further comprises:

means for adjustably positioning said skirt panel in a plane perpendicular to the treadplates.

16. A passenger conveying device according to claim 15, wherein said means for adjustably positioning said skirt panel comprises:

a lip, integrally formed with and extending out from said back surface of said skirt panel; and a bolt, adjustably attached to said frame member of the passenger conveying device and in register with said lip, thereby supporting and permitting adjustment of said skirt panel in a plane perpendicular to the tread-plates.

17. A passenger conveying device, according to claim 10, wherein said formed, seamless cross-sectional profile further comprises:

an upthrust track;

wherein when said upthrust track is positioned in a spaced apart, parallel position relative to a roller track attached to said frame member of the passenger conveying device, rollers attached to the moving treadplates are guided therebetween.

18. A passenger conveying device, according to claim 15, wherein said formed, seamless cross-sectional profile further comprises:

an upthrust track;

wherein when said upthrust track is positioned in a spaced apart, parallel position relative to a roller track attached to said frame member of the passenger conveying device, rollers attached to the moving treadplates are guided therebetween.

19. A passenger conveying device according to claim 10, wherein said formed, seamless cross-sectional profile further comprises:

means for mounting a face panel, said face panel to be attached to said front surface of said skirt panel.

20. A passenger conveying device according to claim 19, wherein said means for mounting said face panel comprises a slot integrally formed in said profile for receiving an edge of said face panel.

21. A passenger conveying device according to claim 18, wherein said formed, seamless cross-sectional profile further comprises:

means for mounting a face panel, said face panel to be attached to said front surface of said skirt panel.

* * * * *